(12) United States Patent
Beaupere et al.

(10) Patent No.: US 8,342,568 B2
(45) Date of Patent: Jan. 1, 2013

(54) COVERING ELEMENT FOR THE INTERIOR OF A MOTOR VEHICLE

(75) Inventors: Stephane Beaupere, Bornel (FR); Claudiu Vasilescu, Meru (FR)

(73) Assignee: Faurecia Interieur Industrie, Nanterre (FR)

( * ) Notice: Subject to any disclaimer, the term of this patent is extended or adjusted under 35 U.S.C. 154(b) by 327 days.

(21) Appl. No.: 12/599,885

(22) PCT Filed: Mar. 20, 2008

(86) PCT No.: PCT/FR2008/050482
§ 371 (c)(1),
(2), (4) Date: Mar. 26, 2010

(87) PCT Pub. No.: WO2008/142309
PCT Pub. Date: Nov. 27, 2008

(65) Prior Publication Data
US 2010/0301590 A1 Dec. 2, 2010

(30) Foreign Application Priority Data

May 16, 2007 (FR) ...................................... 07 55112

(51) Int. Cl.
*B60R 21/215* (2006.01)
(52) U.S. Cl. .................................................. 280/728.3
(58) Field of Classification Search ................ 280/728.3
See application file for complete search history.

(56) References Cited

U.S. PATENT DOCUMENTS

| 5,152,548 | A | * | 10/1992 | Zushi | 280/728.3 |
| 5,195,773 | A | * | 3/1993 | Sawada et al. | 280/728.3 |
| 5,577,766 | A | * | 11/1996 | Niwa et al. | 280/731 |
| 5,582,424 | A | * | 12/1996 | Okuyama et al. | 280/728.3 |

(Continued)

FOREIGN PATENT DOCUMENTS

EP 1 468 878 A1 10/2004

OTHER PUBLICATIONS

International Search Report, dated Sep. 17, 2008, from corresponding PCT application.

*Primary Examiner* — Nicole Verley
(74) *Attorney, Agent, or Firm* — Young & Thompson

(57) ABSTRACT

The covering element has a visible face and an invisible face opposite the visible face. It includes a weakening line which is formed on the invisible face and defines a gate zone which is to open under the pressure of the deployment of the airbag when the motor vehicle is subjected to an impact. The weakening line includes a groove which has a given total length and is delimited by a bottom and at least one transverse rib which projects relative to the bottom and closes the groove at least partially. The covering element has a thickness of material between the visible face and the bottom which is between predetermined minimum and maximum limits over most of the total length of the groove. The groove includes at least one zone of lesser strength in which the thickness of material between the visible face and the bottom is less than the minimum limit.

15 Claims, 3 Drawing Sheets

U.S. PATENT DOCUMENTS

| | | | |
|---|---|---|---|
| 5,685,560 A * | 11/1997 | Sugiyama et al. | 280/731 |
| 6,113,131 A * | 9/2000 | Uehara et al. | 280/728.3 |
| RE36,898 E * | 10/2000 | Sawada et al. | 428/43 |
| 6,337,461 B1 * | 1/2002 | Yasuda et al. | 219/121.62 |
| 6,453,535 B1 * | 9/2002 | Nicholas | 29/413 |
| 6,733,713 B2 * | 5/2004 | Takahashi | 264/328.7 |
| 6,811,735 B2 * | 11/2004 | Ueno et al. | 264/293 |
| 7,000,942 B2 * | 2/2006 | Lutze et al. | 280/728.3 |
| 7,063,349 B2 * | 6/2006 | Takahashi | 280/728.2 |
| 7,156,414 B2 * | 1/2007 | Hayashi et al. | 280/728.3 |
| 7,165,782 B2 * | 1/2007 | Yasuda et al. | 280/728.3 |
| 7,168,731 B2 * | 1/2007 | Yasuda et al. | 280/728.3 |
| 7,213,832 B2 * | 5/2007 | Hayashi | 280/728.3 |
| 7,338,279 B2 * | 3/2008 | Hashimoto et al. | 425/577 |
| 7,398,991 B2 * | 7/2008 | Hayashi et al. | 280/728.3 |
| 7,425,018 B2 * | 9/2008 | Suwama et al. | 280/728.3 |
| 7,571,928 B2 * | 8/2009 | Soejima | 280/728.3 |
| 7,607,681 B2 * | 10/2009 | Okada et al. | 280/728.3 |
| 7,673,896 B2 * | 3/2010 | Yamada et al. | 280/728.3 |
| 7,690,677 B2 * | 4/2010 | Cowelchuk et al. | 280/728.3 |
| 7,748,733 B2 * | 7/2010 | Griebel et al. | 280/728.3 |
| 7,770,916 B2 * | 8/2010 | Okumura et al. | 280/728.3 |
| 7,919,036 B2 * | 4/2011 | Bauer et al. | 264/400 |
| 7,976,764 B2 * | 7/2011 | Schlemmer et al. | 264/400 |
| 8,011,688 B2 * | 9/2011 | Komura et al. | 280/728.3 |
| 2003/0020202 A1 | 1/2003 | Ueno et al. | |
| 2004/0051280 A1 * | 3/2004 | Anaya et al. | 280/728.3 |
| 2004/0262892 A1 * | 12/2004 | Soejima | 280/728.3 |
| 2006/0186646 A1 * | 8/2006 | Bauer et al. | 280/728.3 |
| 2006/0186650 A1 * | 8/2006 | Kuwano et al. | 280/732 |

* cited by examiner

COVERING ELEMENT FOR THE INTERIOR OF A MOTOR VEHICLE

BACKGROUND OF THE INVENTION

1. Field of the Invention

The present invention relates generally to a covering element for the interior of a motor vehicle.

2. Description tf the Related Art

More precisely, the invention relates to a covering element for the interior of a motor vehicle of the type having a visible face and an invisible face opposite the visible face, the covering element comprising a weakening line which is formed on the invisible face and defines a gate zone which is to open under the pressure of the deployment of an airbag when the motor vehicle is subjected to an impact, the weakening line comprising a groove which has a given total length and is delimited by a bottom and at least one transverse rib projecting relative to the bottom and closing the groove at least partially, the covering element having a thickness of material between the visible face and the bottom which is between predetermined minimum and maximum limits over most of the total length of the groove.

Such a covering element is known from JP-2006-315115, which describes that the groove is divided into a plurality of segments of identical length by ribs which are disposed at regular intervals along said groove.

Such a covering element does not comply with the demand made by motor vehicle constructors that the weakening line must remain invisible to the passengers in the vehicle despite ageing of the covering element, due especially to exposure to the sun, and also despite the subsequent steps of production of the covering element, such as, for example, the fixing of the covering element to the structure of the motor vehicle and/or the assembly of additional elements to the covering element by vibration welding, especially the duct which connects the airbag module and the covering element.

Nor does the covering element of the Japanese document meet the demand that the gate zone must permit satisfactory deployment of the airbag at low temperatures, typically at −30° C.

SUMMARY OF THE INVENTION

Within this context, the invention aims to propose a covering element which both meets the demands made by motor vehicle constructors in respect of appearance and permits satisfactory deployment of the airbag at any temperature between +85° C. and −30° C.

To that end, the invention relates to a covering element of the above-mentioned type, characterised in that the groove comprises at least one zone of lesser strength in which the thickness of material between the visible face and the bottom is less than said minimum limit.

The covering element can also have one or more of the following characteristics, considered individually or according to all technically possible combinations:

- the groove comprises a plurality of zones of lesser strength having respective lengths, the sum of said respective lengths being from 2% to 15% of the total length of the groove;
- the thickness of material between the bottom and the visible face in the or each zone of lesser strength is from 0.2 mm to 0.5 mm;
- said minimum and maximum limits of thickness of material are 0.5 mm and 1 mm, respectively;
- the weakening line comprises a plurality of ribs having respective lengths, the sum of said respective lengths being from 5% to 20% of the total length of the groove;
- the or each rib extends over the whole of the width of the groove and has a length of from 0.9 mm to 1.6 mm;
- the or each rib extends from the bottom over a height of from 50% to 100% of the depth of the groove, taken in the region of said rib;
- the weakening line comprises a plurality of ribs distributed along the groove, two adjacent ribs having a spacing between them of from 5 mm to 50 mm;
- the groove has at least one hinge segment which does not have a zone of lesser strength and which is to form a hinge about which at least part of the gate zone pivots under the pressure of the deployment of the airbag;
- the groove has at least one propagation segment which does not have a zone of lesser strength and which extends between the or a zone of lesser strength and the or a hinge segment, the propagation segment being capable of propagating a tear initiated in said zone of lesser strength under the pressure of the deployment of the airbag; and
- the or each zone of lesser strength does not have a rib.

BRIEF DESCRIPTION OF THE DRAWING FIGURES

Other characteristics and advantages of the invention will become apparent from the detailed description thereof which is given hereinbelow, by way of information and without constituting any limitation, with reference to the accompanying figures, in which.

Figure 2:
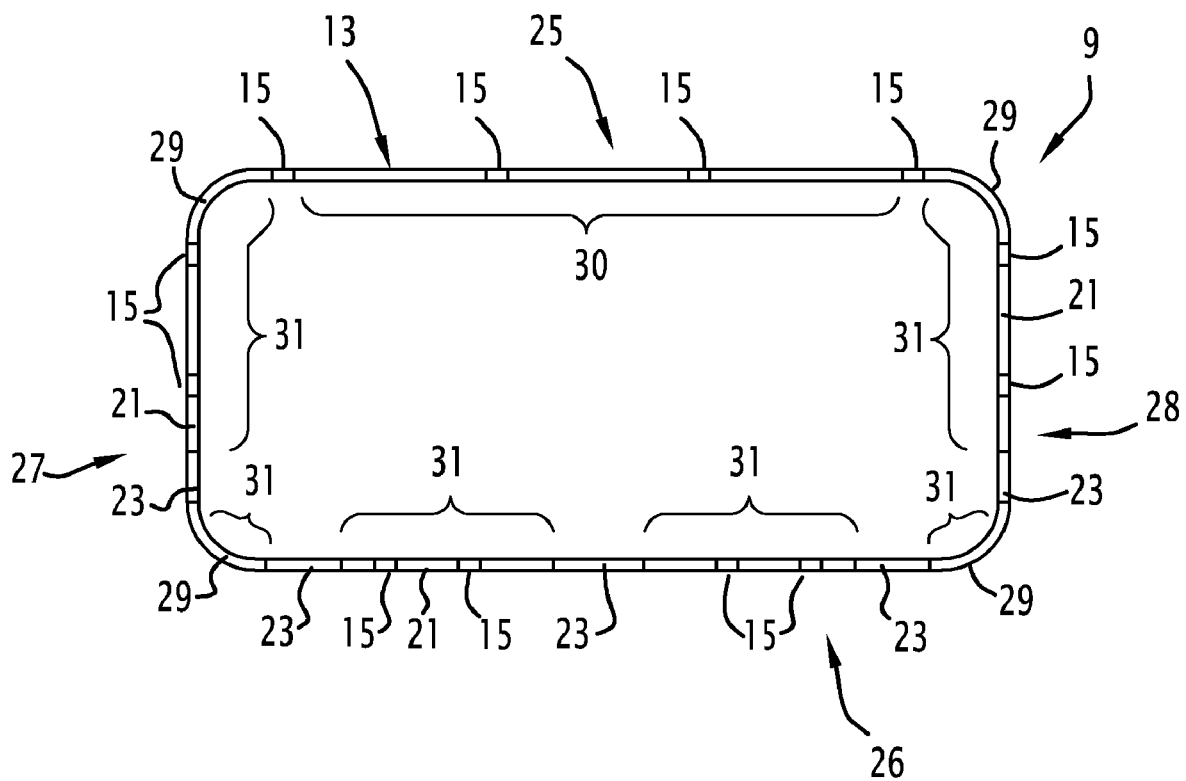
FIG. 2 is a simplified representation of the weakening line of the covering element of FIG. 1, only part of the ribs 15 being shown.
Figure 3:
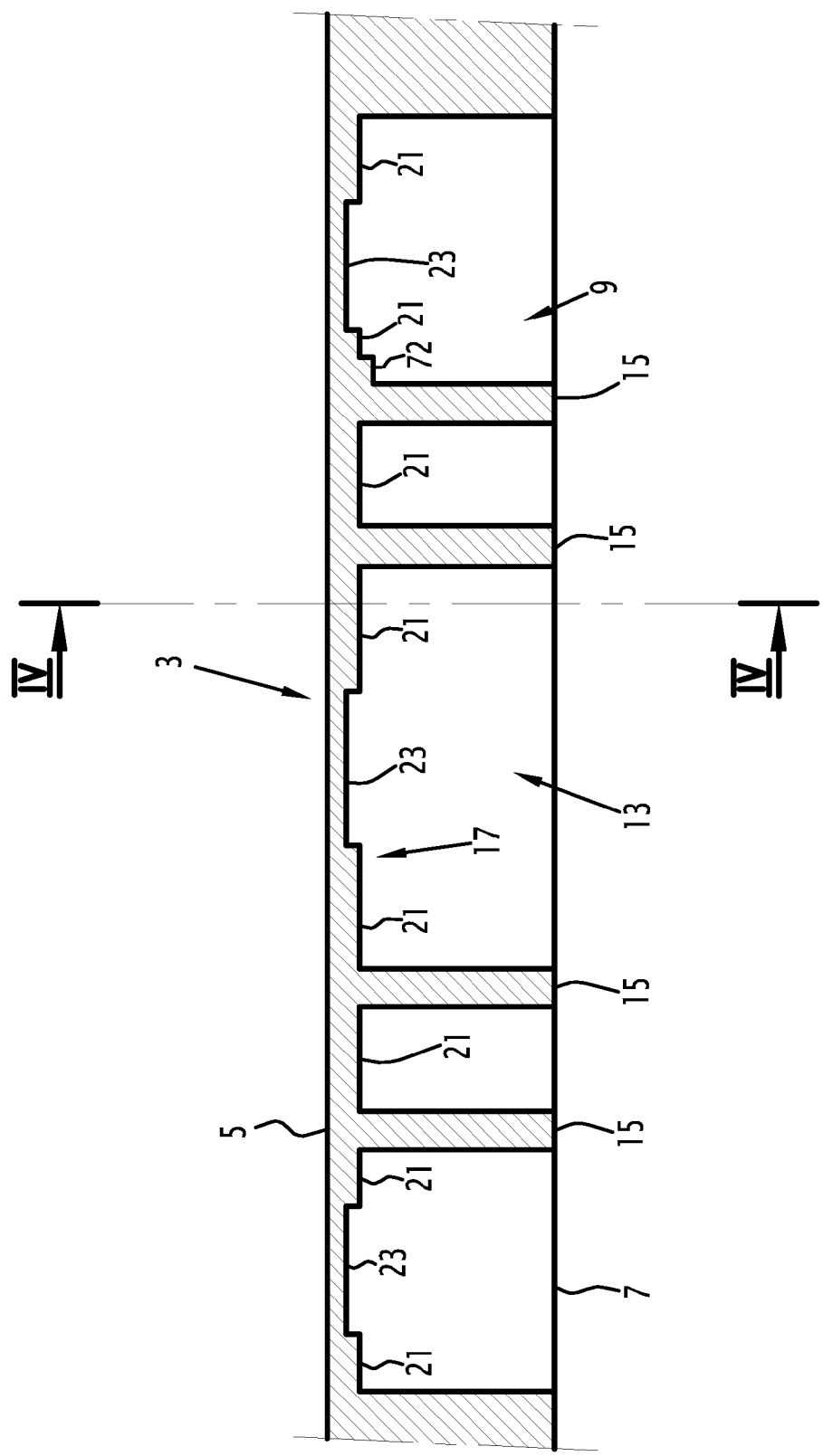
FIG. 3 is a cutaway view of a section of the weakening line of FIG. 2, taken according to the incidence of the arrows 3.
Figure 4:
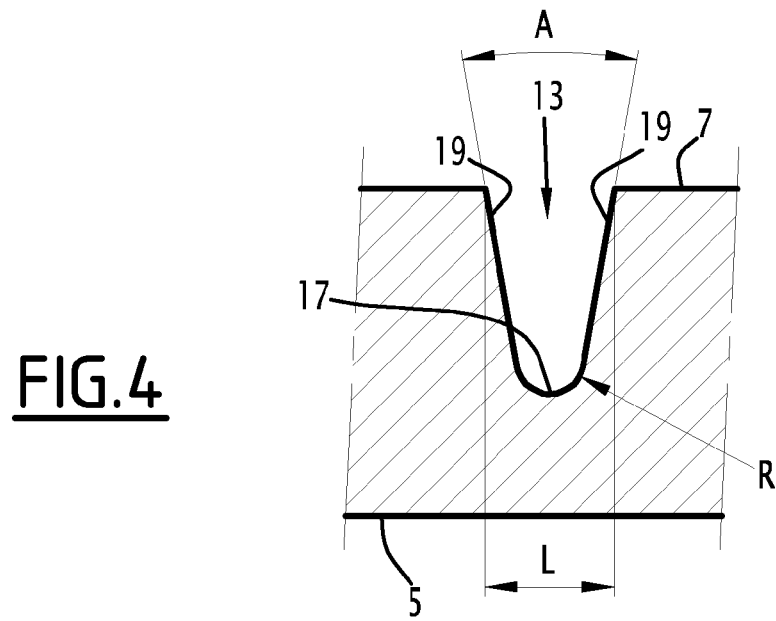
Figure 5:
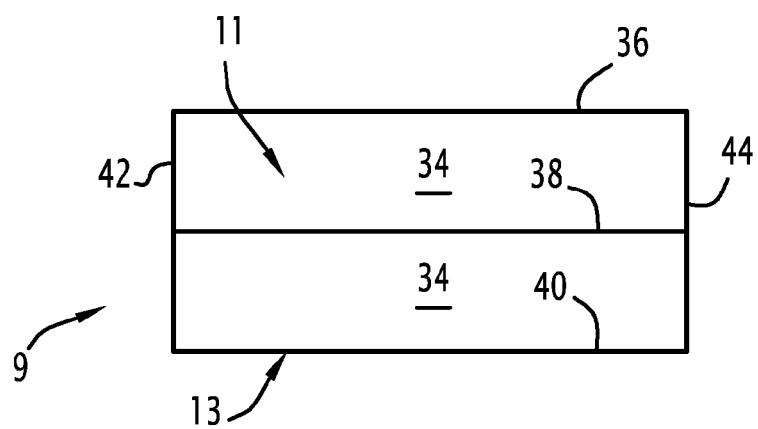
Figure 6:
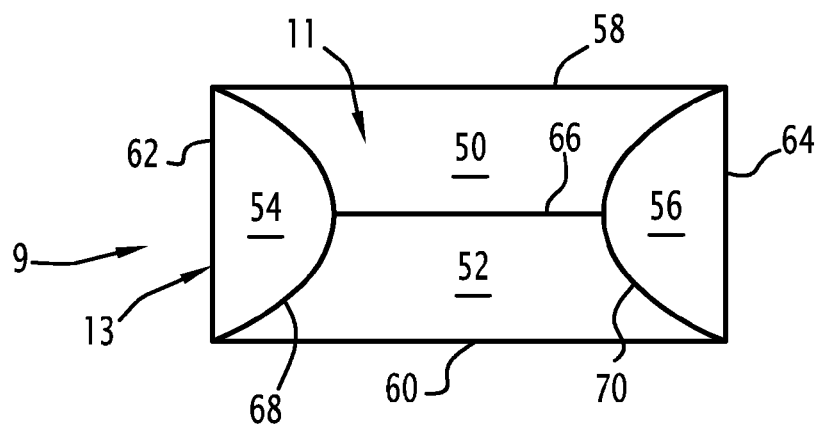

FIG. 4 is a view in transverse section of the weakening line of FIG. 3, taken according to the incidence of the arrows 4; and FIGS. 5 and 6 are simplified representations of two variants of the weakening line of FIG. 2, defining gate zones comprising 2 and 4 flaps, respectively.

DETAILED DESCRIPTION OF THE INVENTION

In the description which follows, the front, back, right and left are to be understood with reference to the normal direction of movement of a motor vehicle.

Figure 1:
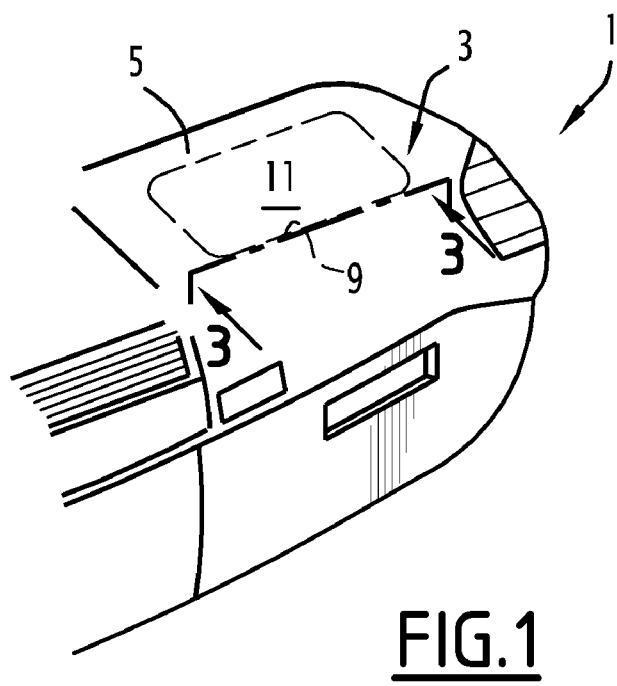
FIG. 1 is a perspective view of a motor vehicle dashboard comprising a covering element according to the invention.

The dashboard 1 shown partially in FIG. 1 comprises a covering element 3, a cavity (not shown) formed beneath the covering element 3, and an airbag (not shown) disposed in the cavity.

The covering element 3 is a panel of plastics material having a visible face 5, which constitutes the upper face of the dashboard, and an invisible face 7 opposite the visible face and facing the cavity.

The covering element 3 comprises a weakening line 9 which is formed on the invisible face 7 and defines a gate zone 11 which is to open under the pressure of the deployment of the airbag when the motor vehicle is subjected to an impact.

To that end, the weakening line 9 and the gate zone 11 are disposed in such a manner that they close the opening through which the airbag is able to emerge from the cavity when it inflates.

As is shown in FIGS. 2 and 3, the weakening line 9 comprises a groove 13 sunk into the invisible face 7 of the covering element, and a plurality of ribs 15. The groove 13 has a closed contour. In the embodiment shown in FIGS. 1 and 2, it has a substantially rectangular general contour with rounded corners. The groove 13 is delimited by a bottom 17 and two opposite lateral edges 19. It is open at the invisible face 7.

The groove 13 comprises zones of normal strength 21 and zones of lesser strength 23.

In the zones of normal strength, the covering element has a thickness of material between the visible face 5 and the bottom 17 of the groove between minimum and maximum limits of 0.5 mm and 1 mm, respectively. Preferably, the limits are 0.6 mm and 0.8 mm. Typically, the thickness is 0.7 mm.

In the zones 23 of lesser strength, the thickness of material between the visible face 5 and the bottom 17 of the groove is less than the above minimum limit, that is to say less than 0.5 mm. Preferably, the thickness of material in each zone of lesser strength is from 0.2 to 0.5 mm. Typically, that thickness is 0.3 mm.

The groove 13 typically comprises a plurality of zones 23 of lesser strength. Those zones 23 have respective lengths whose sum is from 2% to 15% of the total length of the groove 13. Preferably, said sum is from 4% to 8% of the total length of the groove and is typically 6% of the total length of the groove.

The weakening line 9 generally comprises a large number of ribs 15 allowing the connection between the gate zone 11 and the remainder of the covering element to be strengthened. Not all the ribs are shown in FIGS. 2 and 3. Each rib 15 projects from the bottom 17 of the groove. It extends over the whole of the width of the groove 13, from one lateral edge 19 to the other lateral edge 19. Each rib 15 extends, from the bottom 17, over a height of from 50% to 100% of the depth of the groove, taken in the region of said rib. Preferably, each rib extends over a height of from 80% to 100% of the depth of the groove and typically extends over a height of 100% of the depth of the groove.

Each rib 15 extends over a length of from 0.9 mm to 1.6 mm of the width of the groove, taken in the region of said rib. Preferably, each rib extends over a length of 1.2 mm. Below 0.9 mm, the ribs are not rigid enough, and above 1.6 mm they no longer permit controlled breaking.

The ribs 15 have respective lengths whose sum is from 5% to 20% of the total length of the groove, preferably from 7% to 15% of the total length of the groove, and which is typically 10% of the total length of the groove.

In addition, the ribs are distributed along the groove 13 in such a manner that two adjacent ribs have a spacing between them of from 5 mm to 50 mm, preferably from 10 mm to 30 mm, typically of 10 mm.

Of course, no rib 15 is disposed in the regions of lesser strength 23 of the groove.

As is shown in FIG. 2, the zones 21 of medium strength of the groove are constituted by all the zones of said groove 13 that are not occupied either by a rib 15 or by a zone of lesser strength 23.

As is shown in FIG. 4, the groove 13 has a wedge-shaped transverse cross-section. The two transverse walls 19 form an angle A relative to one another and converge towards the bottom 17. The angle A is from 20 to 45° and is typically 35°. The width L of the groove 13 in the region of the invisible face 7, that is to say the spacing between the walls 19, is from 1 to 3 mm and is typically 1.5 mm. The bottom 17, when viewed in transverse section, is curved inwards. Its radius of curvature R is typically from 0.25 mm to 1 mm and is typically 0.5 mm. The walls 19 join substantially tangentially at the bottom 17.

As is shown in FIG. 2, the groove has four substantially straight sides 25, 26, 27 and 28, which are connected by four rounded portions 29. The sides 25 and 26 face the front and the back of the vehicle, respectively. The sides 27 and 28 face the left and the right of the vehicle, respectively.

The groove 13 comprises five zones of lesser strength 23, in which tears can be initiated under the pressure of the deployment of the airbag, a hinge segment 30, which is to form a hinge about which the gate pivots when it opens under the pressure of the deployment of the airbag, and a plurality of segments 31 for propagation of the tears initiated in the zones of lesser strength.

The hinge segment 30 is constituted substantially by the side 25 of the groove. It does not have zones of lesser strength. By contrast, it carries a plurality of ribs 15. Two of those ribs 15 are disposed at the two ends of the segment 30.

Three of the zones of lesser strength 23 are situated on the side 26. One of the zones 23 is situated in the middle of the side 26. The other two zones 23 are situated at the two opposite ends of the side 26.

The last two zones 23 are situated on the left-hand side 27 and on the right-hand side 28, at the ends of those sides that are closest to the rear side 26.

The propagation segments 31 are constituted by all the portions of the groove 13 that extend between two adjacent zones of lesser strength 23, and likewise by the portions of the groove 13 that join the zones of lesser strength 23 to the hinge segments 30. The propagation segments 31 are constituted substantially by zones of normal strength 21 and carry ribs 15.

Several examples of covering elements according to the invention will now be described. In each of the examples, the covering element has, between its visible and invisible faces, a substantially constant thickness outside the groove, of approximately 3.5 mm. The table below shows, for each embodiment, the number of zones of lesser strength 23, the number of ribs 15 and the number of zones of normal strength 21. It also shows the cumulative lengths of the zones 21, of the zones 23 and of the ribs 15, as a proportion of the total length of the groove 13. It also shows, for the zones 21 and 23, the thickness of material between the visible face and the bottom of the groove, given in mm. For the ribs 15, the given thickness corresponds to the thickness of material between the visible face 5 and the free edge of the rib 15.

The table also shows the minimum spacing and the maximum spacing between two consecutive ribs 15 for each example.

TABLE 1

| | Example 1 | | | Example 2 | | | Example 3 | | | Example 4 | | |
| --- | --- | --- | --- | --- | --- | --- | --- | --- | --- | --- | --- | --- |
| | Zones 21 | Zones 23 | Ribs 15 | Zones 21 | Zones 23 | Ribs 15 | Zones 21 | Zones 23 | Ribs 15 | Zones 21 | Zones 23 | Ribs 15 |
| Number | 5 | 44 | 40 | 5 | 44 | 40 | 3 | 37 | 35 | 5 | 49 | 45 |
| Cumulative length | 6% | 84% | 10% | 8% | 80% | 12% | 4% | 89% | 7% | 4% | 88% | 8% |
| Thickness | 0.2 | 0.8 | 3.5 | 0.2 | 0.8 | 3.5 | 0.3 | 0.6 | 3 | 0.3 | 0.7 | 3.5 |
| Spacing min-max | | | 10-40 | | | 10-40 | | | 15-35 | | | 8-35 |

In all the examples, the groove 13 has the substantially rectangular shape shown in FIG. 2. The hinge segment 30 and the zones of lesser strength are disposed, in these examples, as in FIG. 2.

The main characteristics of three embodiments that are not in accordance with the invention, which do not enable either the objective of invisibility of the weakening line or the objective of satisfactory deployment of the airbag to be met, are shown in the table below.

TABLE 2

| | Example 5 | | | Example 6 | | | Example 7 | | |
| --- | --- | --- | --- | --- | --- | --- | --- | --- | --- |
| | Zones 21 | Zones 23 | Ribs 15 | Zones 21 | Zones 23 | Ribs 15 | Zones 21 | Zones 23 | Ribs 15 |
| Number | 10 | 49 | 40 | 5 | 44 | 40 | 5 | 24 | 20 |
| Cumulative length | 6% | 74% | 20% | 15% | 75% | 10% | 6% | 74% | 20% |
| Thickness | 0.5 | 1.5 | 3.5 | 0.3 | 0.8 | 2 | 0.3 | 0.7 | 3 |
| Spacing min-max | | | 5-20 | | | 10-40 | | | 20-50 |

The sizes shown in this table for each example are the same as in the preceding table. In Example 5, the thickness of material in the region of the zones of lesser strength and the zones of normal strength is increased. In addition, the ribs 15 represent 20% of the total length of the groove, which is an increased value. Finally, the zones of lesser strength 23 are each very short, because the groove includes ten zones 23 whose cumulative lengths represent only 6% of the length of the groove. The combination of these three factors means that the connection between the gate zone 11 and the remainder of the covering element 11 is very rigid, so that the gate zone does not open satisfactorily under the pressure of deployment of the airbag.

In Example 6, the height of the ribs 15 is reduced. In addition, the zones of lesser strength 23 are each very long. The groove 13 in fact includes five zones 23 whose cumulative lengths represent 15% of the total length of the groove. The combination of these two factors means that the connection between the gate zone 11 and the remainder of the covering element is not very rigid. Accordingly, the weakening line 9 can become visible when the covering element is subjected to mechanical stresses, for example when the covering element is being fixed to the dashboard, when the dashboard is being fixed to the vehicle, or when the covering element is subjected to prolonged exposure to the sun.

In Example 7, the groove 13 carries ribs 15 which are widely spaced but which are each very rigid, because the cumulative length of the ribs 15 represents 20% of the total length of the groove. Owing to the wide spacing between the ribs 15, the weakening line can become visible locally, between the ribs 15, when the covering element is subjected to high mechanical stresses, especially in the situations mentioned in the preceding paragraph. In addition, because the ribs 15 have considerable cumulative respective lengths, the gate zone 11 tends not to open satisfactorily under the pressure of deployment of the airbag.

The covering element 3 is typically a moulded piece made of polypropylene or of a copolymer of polypropylene and EPDM. If necessary, the material can comprise a mineral filler, for example glass fibres. The weakening line 9 is produced after moulding and cooling of the covering element. It can be produced by cutting, as described, for example, in JP-2006-315115, or by means of a hot blade which causes the plastics material to melt. These processes are known and will not be described here.

The process of opening the gate zone 11 on deployment of the airbag will now be described.

When the motor vehicle is subjected to an impact, a sensor detects the impact and actuates inflation of the bag, especially by pyrotechnic means. In a first phase, the bag fills the cavity as it inflates, and bears against the gate zone 11, on the invisible face 7 of the covering element. It exerts a pressure on the gate zone 11, which pressure increases as the bag inflates. When the pressure exceeds a given limit, one or more of the zones of lesser strength 23 of the groove tear. The tears propagate from one zone of lesser strength 23 to another through the propagation segments 31. They also propagate through the propagation segments 31 to the hinge segment 30. As they propagate through the segments 31, the zones of normal thickness 21 and the ribs 15 tear. It will therefore be understood that the tear begins in the region of the side 26 of the groove, substantially opposite the hinge segment 30, and propagates through the left- and right-hand sides 27 and 28 to the hinge. Once the groove is torn on three sides, that is to say on sides 26, 27 and 28, the gate zone 11 is able to pivot about the hinge segment 30, thus releasing the airbag and allowing it to expand into the passenger compartment of the motor vehicle.

The covering element described above has many advantages.

Because the weakening line comprises a groove and at least one rib for strengthening the groove, the groove having zones of normal strength and at least one zone of lesser strength, it is possible to make the weakening line invisible to the passengers in the vehicle while ensuring that the gate zone opens satisfactorily under the pressure of the deployment of the airbag.

The characteristics of the zones of normal strength, of the zones of lesser strength and of the ribs must be determined case by case, as a function of the thickness of the covering element, the material constituting the covering element, and the characteristics of the airbag.

A first parameter to be determined is the thickness of material in the region of the zones of lesser strength. That thickness must permit adequate initiation of tearing of the groove under the pressure of the airbag. It has thus been determined that a thickness of from 0.2 mm to 0.5 mm is satisfactory in this respect.

In addition, the number and position of the zones of lesser strength must allow tearing to be initiated substantially opposite the hinge segment and then propagate the tear along three sides of the groove. The number and arrangement of the zones of lesser strength must be chosen so as to avoid the propagation of the tear through the hinge segment. An arrangement as shown in FIG. 2 meets these various demands.

The thickness of material in the zones of normal strength, the number, spacing, height and length of the ribs are chosen in order to reach a compromise between:
  the rigidity, over the entire periphery of the groove, of the connection between the gate zone and the remainder of the covering element;
  the propagation of the tear between the zones of lesser strength, and from the zones of lesser strength to the hinge segment.

By using the criteria indicated in the description, the person skilled in the art can fix the various parameters above, in all cases, without making any inventive effort.

There is thus obtained a covering element that is extremely simple and economical to produce, comprising a gate zone delimited by an invisible weakening line, and permitting satisfactory deployment of the airbag. The connection between the gate zone and the remainder of the covering element is such that there is no risk of said gate zone becoming projectile in the case of deployment of the airbag.

In addition, the profile of the groove and the characteristics of the ribs are relatively independent of the material constituting the covering element, within a certain limit. In addition, the profile of the groove and the characteristics of the ribs can readily be determined, whatever the characteristics of the airbag and of the covering element, by calculation and/or by tests.

The covering element can have multiple variants.

The groove can have forms other than those of claim 2, for example the forms shown in FIGS. 4 and 5.

In FIG. 5, the gate zone 11 comprises two rectangular flaps 34. The groove 13 comprises three lines 36, 38 and 40, shown horizontal in FIG. 5, which are parallel with one another, and two lines 42 and 44, shown vertical in FIG. 5, which connect the ends of the horizontal lines. The zones of lesser strength are concentrated in the central horizontal line 38. The upper and lower horizontal lines 36 and 40 constitute the hinge segments. The vertical lines 42 and 44 correspond principally to propagation segments.

In FIG. 6, the gate zone is divided into four flaps 50, 52, 54 and 56. The groove 13 comprises a rectangular peripheral line having two sides 58 and 60, which are shown horizontal in FIG. 6, and two sides 62 and 64, which are shown vertical in FIG. 6, which connect the ends of the horizontal sides. The groove also comprises a central line 66, shown horizontal in FIG. 6, which is situated in the centre of the rectangular peripheral line. The groove also comprises two curved lines 68 and 70 which each connect one end of the central line 66 to two angles of the rectangular peripheral line. The segments of lesser strength are concentrated in the central line 66. The sides 58, 60, 62 and 64 constitute hinge segments for the four flaps. The curved lines 68 and 70 correspond principally to propagation segments.

The visible face 5 of the covering element can be free or, on the other hand, can be painted or covered with a decoration.

The decoration can itself also comprise a weakening line, coincident with that of the covering element.

The covering element can be made of plastics materials other than those mentioned hereinbefore.

The weakening line can be formed on the invisible face by manufacturing techniques other than those described hereinbefore. They can, for example, be formed during moulding.

It is possible for the covering element not to be integrated into the dashboard of the motor vehicle but, for example, to be disposed at the centre of the steering wheel. It can likewise also be disposed on the doors of the vehicle and, more generally, at any location in the motor vehicle interior at which there is an airbag.

The zones of normal strength of the groove can have the same thickness throughout. Alternatively, they can comprise, locally, greater thicknesses (zone 72 in FIG. 3) or smaller thicknesses, within the limits of the maximum and minimum limits defined above. This allows the strength of the connection between the gate zone and the remainder of the covering element to be adjusted locally.

Likewise, the ribs can have the same height throughout, the same length, the same spacing. Conversely, some of the ribs 15 can have heights, lengths or spacing that are different from those of the other ribs.

Likewise, the zones of lesser strength can all have the same thickness of material. Conversely, some of the zones of lesser strength can have different thicknesses of material, within the limits of the range specified above.

The groove can have the same cross-section throughout, or it can comprise portions having different cross-sections.

The groove can have a different cross-section from that shown in FIG. 4. The walls 19 can be parallel with one another. The bottom 17 can be flat or, alternatively, V-shaped.

The invention claimed is:

1. A covering element for the interior of a motor vehicle, comprising:
    a visible face (5) and an invisible face (7) opposite the visible face (5);
    a given thickness of material between the visible face and the invisible face;
    a weakening line (9) which is formed on the invisible face (7) and defines a gate zone (11) which is to open under the pressure of the deployment of the airbag when the motor vehicle is subjected to an impact, the weakening line (9) comprising a groove (13) which has a given total length and is delimited by a bottom (17); and
    at least one transverse rib (15) which projects relative to the bottom (17) toward the invisible face and closes the groove (13) at least partially, the weakening line comprising between the transverse ribs zones of normal strength and/or zones of lesser strength, the zones of normal strength extending over most of the total length of the groove (13), the zones of normal strength having a thickness of material between the visible face (5) and the bottom (17) which is continuously between predetermined minimum and maximum limits,
    wherein each zone of lesser strength (23) has a thickness of material between the visible face (5) and the bottom (17) which is continuously less than said minimum limit.

2. The covering element according to claim 1, wherein the groove (13) comprises a plurality of zones of lesser strength

(23) having respective lengths, the sum of said respective lengths being from 2% to 15% of the total length of the groove (13).

3. The covering element according to claim 2, wherein the thickness of material between the bottom (17) and the visible face (5) in the, or each, zone of lesser strength (23) is from 0.2 mm to 0.5 mm.

4. The covering element according to claim 2, wherein said minimum and maximum limits of the thickness of material are 0.5 mm and 1 mm, respectively.

5. The covering element according to claim 1, wherein the thickness of material between the bottom (17) and the visible face (5) in the, or each, zone of lesser strength (23) is from 0.2 mm to 0.5 mm.

6. The covering element according to claim 5, wherein said minimum and maximum limits of the thickness of material are 0.5 mm and 1 mm, respectively.

7. The covering element according to claim 1, wherein said minimum and maximum limits of the thickness of material are 0.5 mm and 1 mm, respectively.

8. The covering element according to claim 1, wherein the weakening line (9) comprises a plurality of ribs (15) having respective lengths, the sum of said respective lengths being from 5% to 20% of the total length of the groove (13).

9. The covering element according to claim 1, wherein the, or each, rib (15) extends over the whole of the width of the groove (13) and has a length of from 0.9 mm to 1.6 mm.

10. The covering element according to claim 1, wherein the, or each, rib (15) extends from the bottom (17) over a height of from 50% to 100% of the depth of the groove (13), taken in the region of said rib (15).

11. The covering element according to claim 1, wherein the weakening line (9) comprises a plurality of ribs (15) distributed along the groove (13), two adjacent ribs (15) having between them a spacing of from 5 mm to 50 mm.

12. The covering element according to claim 1, wherein the groove (13) has at least one hinge segment (30) which does not have a zone of lesser strength (23) and which is to form a hinge about which at least part of the gate zone (11) pivots under the pressure of the deployment of the airbag.

13. The covering element according to claim 12, wherein the groove (13) has at least one propagation segment (31) which does not have a zone of lesser strength (23) and which extends between the, or a, zone of lesser strength (23) and the or a hinge segment (30), the propagation segment (31) being capable of propagating a tear initiated in said zone of lesser strength (23) under the pressure of the deployment of the airbag.

14. The covering element according to claim 1, wherein the, or each, zone of lesser strength (23) does not have a rib (15).

15. The covering element according to claim 1, wherein the weakening line comprises between the transverse ribs only zones of normal strength and/or zones of lesser strength.

* * * * *